United States Patent [19]

Piccirilo

[11] Patent Number: 4,845,144

[45] Date of Patent: Jul. 4, 1989

[54] FLUID RESISTANT COATING COMPOSITION

[75] Inventor: Alessandro Piccirilo, Yonkers, N.Y.

[73] Assignee: Magic Stuff, Inc., Yonkers, N.Y.

[21] Appl. No.: 40,012

[22] Filed: Apr. 17, 1987

[51] Int. Cl.$^4$ .............................................. C08K 5/05
[52] U.S. Cl. .................................. 524/388; 524/423; 524/524; 524/439; 523/222
[58] Field of Search ............... 524/423, 388, 524, 439; 523/222

[56] References Cited

U.S. PATENT DOCUMENTS

| | | | |
|---|---|---|---|
| 3,121,702 | 2/1964 | Sherr | 524/423 |
| 3,303,147 | 2/1967 | Elden | 260/8 |
| 3,305,518 | 2/1967 | Jackacki | 524/423 |
| 3,554,942 | 1/1971 | Zdanowski et al. | 260/17 |
| 3,639,653 | 2/1972 | Clark et al. | 260/33.8 R |
| 3,869,415 | 3/1975 | Williams | 524/423 |
| 3,915,919 | 10/1975 | Nishioka et al. | 524/423 |
| 4,039,492 | 8/1977 | Hamilton | 260/8 |
| 4,042,409 | 8/1977 | Terada et al. | 524/423 |
| 4,060,425 | 11/1977 | Harada et al. | 524/423 |
| 4,148,781 | 4/1979 | Narukawa et al. | 524/423 |
| 4,171,407 | 10/1979 | Elser et al. | 428/500 |
| 4,251,416 | 2/1981 | Palmer | 524/423 |
| 4,287,103 | 9/1981 | Francis et al. | 524/423 |
| 4,430,367 | 2/1984 | Lat | 524/423 |
| 4,454,267 | 6/1984 | Williams | 524/43 |

*Primary Examiner*—Joseph L. Schofer
*Assistant Examiner*—J. M. Reddick
*Attorney, Agent, or Firm*—Pennie & Edmonds

[57] ABSTRACT

A fire-retardant, fluid-resistant coating composition having enhanced bonding strength and increased aesthetic appeal. The composition, comprising from 3-4 parts of a liquid acrylic emulsion, from 1-2 parts of a liquid latex polymer suspension, from 1-3 parts of an adhesive material and from 1-2 parts of a gypsum-based powder, may be sprayed, brushed or rolled onto a variety of substrates. A coated product may also be produced by applying the coating composition to a substrate comprising a reinforcing material such as glass fibres so as to form sheets or laminates which may be rolled for transportation and storage with minimal danger of cracking, chipping or peeling. The composition may also be utilized to provide an adhesive bond by applying it to a surface of a first substrate and then contacting the coated surface with a second substrate while the composition is still viscous.

21 Claims, No Drawings

FLUID RESISTANT COATING COMPOSITION

FIELD OF THE INVENTION

The invention relates to a coating composition and products produced therewith for providing improved weatherproofing and structural strength, coupled with an attractive aesthetic appearance and a tightly adherent bond to a substrate so that the coating is capable of resisting chipping and cracking.

BACKGROUND OF THE INVENTION

A coating may be defined as a layer of a substance which is used to protect and/or decorate a surface. It must adhere to a substrate, in contrast to a covering, which may simply surround or lie over the surface of such a substrate without bonding thereto. Coatings are primarily available as liquid or fusible compositions wherein the liquid portions are usually aqueous or organic solutions. Coating are meant to be applied to the surface of a substrate to be treated. The liquid portion enables the coating to flow smoothly over the surface of the substrate, chiefly due to forces of surface tension, before evaporating or reacting with the other coating components to form a solid, tightly adherent composition thereon.

At the time of application, coatings generally include an organic polymeric binder, one or more pigments, a volatile thinner or solvent and various additional additives. Each ingredient, in itself, may be a complicated mixture, depending upon the end use of the coating.

The binder is ordinarily a film-forming organic polymer, such as cellulose nitrate, an alkyd resin, or a mixture of such polymers, having glassy, plastic, or rubbery properties in the dried state. Binders are grouped into certain overlapping classes, such as acrylic, vinyl, alkyd, polyester, etc. The structure of the binder molecules and the forces operating between the molecules determines the properties of these binders. The polymeric binder thus adheres to the substrate and also binds the pigment particles, if present, into a coherent film.

The pigments are inorganic or organic powders of varying hiding power and color. They are practically insoluble in the binder and confer color, opacity, and a variety of mechanical and physical properties to the film.

The volatile thinner or solvent, which evaporates after the coating is applied, is used to reduce the consistency of the coating so that it may be brushed, sprayed, calendered, dipped, electrocoated, or otherwise applied to the surface of a substrate. Volatile thinners include a variety of organic liquids, such as esters, alcohols, ketones, naphthas, or paraffin hydrocarbons, depending upon the required solubility characteristics of the particular binder. The thinner may be water, as, for example, in emulsion coatings, or an organic nonsolvent, as in organosols.

Small percentages of other materials may also be included within the above described coating compositions as additives, such as metallic driers for coatings that dry by oxidation, agents to stabilize pigment dispersions and agents to reduce or eliminate foaming of the composition during mixing.

One common type of coating composition is paint, which is made up of pigments blended intimately with a binder. The film-forming materials, i.e., mainly the pigment and binder, are together called the nonvolatiles, or solids. A binder, with or without a thinner, but without pigment, can be generally referred to as a varnish, or sometimes as a "clear lacquer."

Some coatings for specialized applications are applied as monomers and then polymerized in situ. However, most coatings applied as liquids form dry films in other ways. Air-drying coatings harden by evaporation of the thinner on exposure to ventilated atmospheres at room temperature; examples of these are shellac, oxidizing alkyds, and cellulose nitrate lacquers. Other coatings, such as those based on urea-formaldehyde or melamine-formaldehyde resins, undergo condensation polymerization reactions. This usually requires the application of heat.

When temperatures above 150° F. are used to dry a coating, the resultant composition is said to be a baked coating. Some coatings, such as those based on linseed oil, form dry films by way of polymerization reactions which are induced by absorption of atmospheric oxygen, leading to the subsequent gelation and hardening of the composition. Still others may be applied at elevated temperatures without a volatile solvent and dried by cooling them to room temperature. An example of this type is the vinyl copolymer coating often calendered into fabrics.

SUMMARY OF THE INVENTION

Applicant has now discovered a novel, fluid-resistant, fire-retardant coating composition having improved weather resistance and enhanced bonding strength coupled with a high degree of aesthetic appeal. These compositions may be sprayed, brushed or rolled onto the surface of numerous diverse substrates including, but not limited to, glass or glass fibers, fiberboard, wood, stone, cement, styrofoam, etc. to form a fire retardant and water resistant flexible coating having a high bonding strength and good chipping and peeling resistance.

One embodiment of the present invention comprises a coating composition having the following components: a liquid latex polymer suspension, an acrylic emulsion, a gypsum-based powder compound and an adhesive material. The mixture may further comprise a drying agent selected from plaster of Paris and Gesso to chemically combine with the liquid solvent. The effect of this material is to reduce the drying time of the coating, thus reducing the interval before a coated substrate may be put into service or before a second coat of the material may be added.

The latex polymer suspension may further include additional additives such as pigments, antifoaming agents and glycerols which may be provided by the addition of a water-based latex paint containing such a latex polymer suspension. The percentage of solids represented by these latex suspensions are not critical to the compositions of the invention, and can vary over a wide range of between 1 and 50 weight percent. Solids contents below 1 percent provide a composition containing a high amount of water which must be compensated for by adding more acrylic solids, gypsum or adhesive. Solids contents above 50%, on the other hand, cause the formulations to be more difficult to mix and may require that additional water be added.

A preferred latex polymer suspension is ordinary housepaint. Within such water-based paints, the percentage solids typically ranges between about 5-25% by weight and preferably 10-20% by weight. The latex polymer suspension component typically comprises between about 1-2 parts by volume of applicant's coating composition, although other ranges can be used.

Regarding the acrylic emulsion, this component is soluble in aqueous solvents and contains a percentage of solids ranging between about 35 and 50%, and preferably between 40 and 45%, by weight. As with the latex suspension, the percent solids of the acrylic emulsion can vary over a wide range such as from about 25 to 75 weight percent without departing from the invention. The emulsion component preferably constitutes between about 3-4 parts of the coating composition, by volume.

The source of the gypsum-based powder component is preferably a spackling or plastering powder which constitutes between about 1-2 parts of the coating composition by volume. The gypsum adds strength and durability to the coated surface and is particularly effective in absorbing the aqueous component of the latex polymer suspension. This component may be increased when latex and acrylic emulsions having a low solids content are used to absorb excess water.

The adhesive material which is used to facilitate the bonding of the components, both to one another and to an underlying substrate, is preferably a glue. This material represents between about 1-3 parts by volume of the coating composition and may either be added separately or in combination with the gypsum-based powder composition. Glues for use in applicants' coating composition may be selected from among animal and vegetable glues and synthetic plastic adhesive resins.

In a further embodiment, the composition may also include one or more filler materials which serve to reinforce the coating, facilitating the production of reinforced sheets or laminates which may be cut to a required size and rolled for storage with a negligible amount of cracking, chipping or peeling of the coating, in contrast to other known coating materials. These filler materials may be selected from among glass beads, glass fibers, carbon fibers, mineral aggregates, cloths, whether woven or in fiber form and metal powders. In order to form these reinforced sheets or laminates, applicants' coating composition may be applied to one or more layers of a substrate formed by the filler materials and permitted to cure.

In a still further embodiment of applicants' invention, the coating composition may itself serve as an adhesive to bind two substrates together. The coating, with or without a reinforcing filler, may initially be applied to the surface of a first substrate, such as masonry, wood, stone, cement or concrete, and, while still in a viscous state, a second substrate, selected from among styrofoam, cloth or other woven materials, fiberboard, steel sheets, wood paneling, wallpaper and the like, may be pressed against the coated surface of the first substrate to facilitate an adhesion therebetween.

DETAILED DESCRIPTION OF THE INVENTION

The best mode of practicing the present invention specifically relates to a composition which includes the following ingredients: an aqueous colloidal latex polymer suspension; an acrylic polymer emulsion; a dry gypsum-based powder and a glue. With regard to the latex polymer suspension utilized by applicant, this composition is preferably comprised of a polymer dispersion of polyvinyl acetate/acrylic resin esters in an aqueous solvent. Such synthetic resin latexes are commonly encountered constituents of latex adhesives, and thus they also serve to enhance the adhesive capability of applicant's coating material. In addition to the latex polymers described above, a number of additive compositions may also be included with the latex suspension so as to enhance the covering and bonding properties of applicant's coating composition.

For example, one or more varieties of colorizing materials, such as titanium dioxide ($TiO_2$) and other commonly used organic and inorganic pigments, may be added in order to impart a preferred color to the coating composition. Such materials may be added in amounts ranging up to 100% by weight of the latex polymer suspension. Antifoaming agents, such as silicate compounds, may also be included. These are commonly utilized by those skilled in the art to prevent the foaming which may lead to the formation of emulsions in the mixing stage. A further worthwhile additive is a glycerol compound, e.g., ethylene glycol, which may be included with the latex as a "freeze-thaw" additive to preserve the fluidity of the composition despite temperature variations during its storage and application.

The percentage of solids contained within the latex dispersion is not critical to the invention and any amount thereof may be used to compound a usable component of applicant's coating composition. In order to produce an easily workable and mixable composition however, applicant has found that between about 1-50%, more preferably 5-25%, and most preferably between about 10-20% solids by weight is advantageous.

An especially preferred latex polymer suspension may be introduced into applicant's coating composition by the addition of a commercially available latex base paint, such as Regal ® Wall Satin Latex Interior Paint, which is manufactured by Benjamin Moore & Co. of Montvale, N.J. In these paints, the percentage of solids ranges from about 15-20% by weight. It has also been determined that the additives normally included in paint formulations such as those described above do not detract from the properties obtainable by the compositions of the invention, and are preferred for use therein.

With regard to the acrylic polymer emulsion component of applicant's coating composition, this material serves as a binder to maintain the pigment particles in a coherent film and to enhance the bonding strength of the coating to an underlying substrate upon which it is applied. By "acrylic emulsion," applicant means a dispersion of an acrylic polymer in an organic or an aqueous medium. The percentage of solids within the suspension also is not critical to the invention and any amount may be used. However, to obtain a workable and mixable consistency in the resulting composition, it has been found that between about 25 and 75, preferably 35 and 50, and most preferably between 40 and 45 percent solids by weight is most advantageous.

An especially preferred acrylic polymer emulsion is Liquitex ® Acrylic Gloss Medium and Varnish manufactured by Binney and Smith of Easton, Pa. Other commonly used acrylic polymer emulsions, however, include poly(methyl methacrylate) compositions such as Rhoplex AC 33, manufactured by the Rohm & Haas Company of Philadelphia, Pa. and Lucite 44 and 45, manufactured by the DuPont Corporation of Delaware. In the former, the emulsion is water soluble, while in the latter, the composition has a pastelike consistency and is only soluble in organic solvents such as turpentine.

The third ingredient of applicant's coating is a gypsum-based composition such as a plaster powder or a spackling powder. The term "gypsum" as used herein is intended to include gypsum such as is normally understood in the art. This would include calcium sulfate ($CaSO_4$) and its various forms such as calcium sulfate anhydrate, calcium sulfate hemihydrate, and calcium sulfate dihydrate, as well as calcined gypsum, pressure calcined gypsum, and plaster of Paris. One purpose of the gypsum component is to strengthen the coating composition by increasing the hardness of the coating surface. In addition, the gypsum component also forms a strong bond between the coating and the underlying substrate. Furthermore, the coating material acts as an adhesive while drying due to the inclusion of the gypsum component so that additional construction materials, i.e., panels, cloths, foams, wallpapers, moisture barriers and the like, may be contacted against the surface of the coating and retained thereupon once the composition is completely dry.

A still further reason for the addition of they gypsum component is that this material is very hygroscopic and thus serves as an ideal vehicle to absorb the aqueous solvent which serves as a carrier for the latex dispersion. This solvent absorption is necessary in order to permit the coating composition to cure into a durable layer which is highly resistant to peeling, chipping or cracking from the underlying substrate. Compositions of this type which are especially preferred for use with applicant's coating composition include Durabond Powder Spackling Putty produced by USG Industries, Inc. of Chicago, Ill.

The fourth component of applicant's coating composition is an adhesive material, such as a glue. The glue may be added independently, as by the addition of a product such as Elmers ® Glue-All produced by Borden, Inc. of Columbus, Ohio, or, for convenience, it may be added in combination with the above-described gypsum component by the addition of a product such as Glue Base Plaster Patch, produced by United Gilsonite Laboratories of Scranton, Pa.

By the term "glue," applicant is referring to both natural and synthetic substances used for joining or bonding other materials together by surface attachment. Materials commonly referred to as "glue," "paste," "mucilage," "rubber cement" and the like would therefore be included within this class. The term "glue," as used by applicant, is intended to include not only animal, casein and vegetable glues and natural resins but also the synthetic plastic resins, which may be incorporated within applicant's coating composition to perform a similar bonding function.

The drying time of applicant's coating compositions, which normally averages about one-half hour per coat, may be reduced by the addition of a drying agent. Any material capable of chemically combining with the water in the composition to reduce the setting, i.e, hardening, time may be used but the preferred additives are those which include additional gypsum in the form of, for example, plaster of Paris or Gesso, i.e., a mixture of glue, water and gypsum. These inexpensive additives have proven to be highly efficient in reducing the drying time of the coating due to their highly hygroscopic nature and their compatibility with the other components of the coating composition.

Also, when relatively low solids content latex dispersions and/or acrylic emulsions are used, a greater amount of gypsum component can be used. This provides coatings which are harder, more dense, and less flexible than coating compositions utilizing higher solids content latex dispersions and acrylic emulsions. Conversely, where greater flexibility of the coating is desired, a greater amount of latex and acrylic solids and a lesser amount of gypsum component may be used.

In small quantities, the components of the coating may be mixed together by hand by stirring the dry powder gypsum-based component into a mixture of the liquid-based latex dispersion together with the acrylic polymer emulsion. The glue may be introduced as a viscous liquid or, when added in combination with one of the gypsum-based compositions, it may also be stirred into the mixture as a dry powder. In larger quantities, such as those required for the commercial manufacture and distribution of the coating, it is useful to apply mixing techniques and procedures similar to those utilized in the manufacture of paints, varnishes, lacquers and the like, which are well-known to those skilled in this art.

As noted above, applicant's novel composition may be coated upon a variety of substrates to both improve the aesthetic appeal thereof and to protect their surfaces from damage due to the effects of fire and moisture. The composition of the invention may further include additional pigments, fillers and reinforcing materials where desired for certain applications. Standard paint additives for imparting a wide choice of colors to the composition are easily introduced, as are well-known fillers or reinforcements, such as glass beads, glass fibers, carbon fibers, mineral aggregates, cloths, whether woven or in fiber form, metal powders, etc., which impart improved physical properties to the coating material. If desired, special additives such as antioxidants, U.V. stabilizers, antifoaming agents, etc. can be added to the composition to impart certain desired features to the coating.

A preferred embodiment of the invention contemplates the formation of a coated product produced by the application of the above-described coating composition to a substrate such as a layer of a fibrous material, e.g., glass or ceramic fibers, or woven cloth, matte or fabric, so as to form fiber-reinforced sheets or laminates. These products comprise a layer of the fiber reinforcement, whether random or woven, coated with a desired thickness of applicant's coating composition. The resultant fabric-like product may then serve as a structural support and protective layer for various construction applications.

An optimum coating thickness for forming such coated sheets ranges from about 0.03-0.06 inch but other thicknesses may be used depending upon the particular requirements of the intended application. The material may, for example, be cast into sheets or laminates for application to vertical or horizontal wall surfaces in order to both beautify these areas and to protect them from the effects of fire as well as wear produced by the elements. These coated sheets or laminates may be rolled and stored prior to their installation with minimal danger of cracking, chipping or peeling of the reinforced coating material in comparison to coating materials lacking such reinforcement. If desired, however, this reinforced coating composition may be sprayed or brushed onto such surfaces in areas where the application of sheets or laminates is not practical or desired.

In addition, applicant's coating composition may be applied directly to the surface of substrates such as masonry, wood, fiberboard, styrofoam, stone, cement, concrete and the like by spraying, brushing, troweling etc. to provide a fast bonding, weather-resistant protective coating thereupon. These coated substrates are then very useful in the production of both interior and exterior structural components and they may subsequently be painted or wallpapered to enhance their aesthetic appeal. In addition, when the coating composition is applied directly onto the surface of a substrate, it can also serve as an adhesive to join styrofoam, fiberboard, steel or wood paneling, wallpaper, etc. to substrates such as structural components comprised of masonry, cement, stone, wood, concrete, etc. Applicant's composition thus provides a strong, inexpensive bond between these materials without the use of fastening means such as nails, screws or bolts. However, applicant's reinforced products can be attached to a substrate by adhesives or by such fastening means, if desired.

EXAMPLES

The following examples disclose the preferred composition of applicant's coating and demonstrate the strength and durability of these coatings by setting forth the results of various comparative tests. These examples are set forth for the purposes of illustration only and are not to be construed as limiting the invention in any manner.

EXAMPLE 1

A coating composition as taught by applicant was produced by combining the following components:

|  | Parts (by volume) |
| --- | --- |
| liquid acrylic emulsion | 3-4 |
| latex polymer suspension | 1-2 |
| gypsum-based composition | 1-2 |
| glue | 1-3 |

A minimal amount of water (less than 1 part by volume) was also added to the composition as necessary to assist in the hydration of the gypsum-based material. Upon mixing, the composition formed a fluid-resistant, fire-retardant coating composition which resists shipping and cracking from a substrate to which it is applied.

EXAMPLE 2

An especially preferred coating composition was produced according to the present invention by combining:

|  | Parts (by volume) |
| --- | --- |
| Liquitex ® Acrylic Gloss Medium and Varnish | 3.5 |
| Regal ® Wall Satin Latex Interior Flat Paint | 1.5 |
| Durabond Spackling Powder | 1.5 |
| Glue Base Plaster Patch | 2 |

This composition, when mixed and placed within an airtight container has maintained its liquid consistency for an extended period and remains capable of forming a durable coating upon an interior or exterior structural surface.

EXAMPLE 3

The composition of Example 2 was coated upon a piece of plywood to a thickness of about 0.04 inch. The coated wood was then permitted to remain outdoors, exposed to the elements, for over one year with no detectable change in the color of the coating and with no deterioration of the underlying wood substrate. This clearly supports applicant's contention that the coating composition of the invention serves not only to enhance the aesthetic appearance of the coated substrate but also to protect the surface of the substrate from the effects of the elements.

EXAMPLE 4

In flame spread tests wherein applicant's novel composition was coated onto a woodfiber board and compared with ceiling tiles coated with a standard coating composition manufactured by Armstrong World Industries, Inc., of Lancaster, Pa., the time required to spread a test flame across the surface of the woodfiber board coated by the composition of the invention was inhibited by up to 14% compared to standard fire-retardant coated ceiling tile. Whereas the flame required only 53 seconds to spread across the surface of the comparison ceiling panel, 61 seconds were required for the panel coated with applicant's composition to become engulfed. This is clearly indicative of the fire-resistant properties of applicant's novel coating.

While it is apparant that the invention herein disclosed is well calculated to fulfill the desired results, it will be appreciated that numerous modifications and embodiments may be devised by those skilled in the art, and it is intended that the appended claims cover all such modifications and embodiments as fall within the true spirit and scope of the present invention.

I claim:

1. A coating composition which comprises:
   from about 1-2 parts by volume of a liquid latex polymer suspension of a blend of polyvinyl acetate/acrylic resin esters dispersed in an aqueous solvent to impart an increased level of flexibility to said composition;
   from about 3-4 parts by volume of an acrylic emulsion to serve as a film-forming binder for said composition;
   from about 1-2 parts by volume of a gypsum-based powder compound to impart a required degree of strength and durability to said coating composition and to absorb substantially a major portion of said aqueous solvent which comprises said liquid latex polymer suspension; and.
   from about 1-3 parts by volume of a glue to bond together said polymer suspension, said acrylic emulsion and said gypsum-based power compound and to facilitate adhesion of said coating composition to a substrate to which said coating composition is applied.

2. The composition of claim 1 which further comprises a drying agent capable of combining with a liquid fraction of said latex polymer suspension to reduce the drying time of said composition.

3. The composition of claim 1 wherein the percentage of solids in said latex polymer suspension ranges between about 5-25% by weight of said suspension.

4. The composition of claim 3 wherein said percentage of solids in said latex polymer suspension ranges between about 15-20% by weight of said suspension.

5. The composition of claim 1 wherein said latex polymer suspension further includes one or more additives selected from the group consisting of pigments, antifoaming agents and glycerols.

6. The composition of claim 5 wherein said latex polymer suspension is added as a water-based latex paint.

7. The composition of claim 1 wherein said acrylic emulsion is soluble in an aqueous medium.

8. The composition of claim 1 wherein the percentage of solids in said acrylic emulsion ranges between about 35 and 50% by weight of said composition.

9. The composition of claim 1 wherein said gypsum-based powder compound is a gypsum-based spackling or plastering powder.

10. The composition of claim 1 wherein said glue is selected from the group consisting of animal glues, vegetable glues and synthetic plastic adhesive resins.

11. The composition of claim 1 wherein said glue may be added to the coating composition either as a separate ingredient or in combination with a gypsum-based powder composition.

12. The composition of claim 1 which further comprises one or more filler materials for reinforcing said composition.

13. The composition of claim 12 wherein said filler material is selected from the group consisting of glass beads, glass fibers, carbon fibers, mineral aggregates, cloths, metal powders or mixtures thereof.

14. A coating composition which comprises:
from about 1-2 parts by volume of a water-based latex paint comprising a polymer dispersion of polyvinyl acetate/acrylic resin esters;
from about 3-4 parts by volume of a liquid acrylic emulsion;
from about 1-2 parts by volume of gypsum-based spackling powder; and
from about 1-3 parts by volume of a glue based plaster powder.

15. A coating composition which comprises:
from about 1-2 parts by volume of a water-based latex paint comprising a polymer dispersion of a blend of polyvinyl acetate/acrylic resin esters;
from about 3-4 parts by volume of a liquid acrylic emulsion;
from about 1-2 parts by volume of gypsum-based spackling powder;
from about 1-3 parts by volume of a glue based plaster powder; and
a filler material.

16. The coating composition of claim 15 wherein the filler material is glass beads, glass fiber, carbon fiber, mineral aggregate, cloth, metal powder or mixtures thereof.

17. The coating composition of claim 15 in the form of sheets, each having a thickness between about 0.03 and 0.06 inch.

18. A coating composition which consists essentially of:
from about 1-2 parts by volume of a liquid latex polymer suspension of a blend of polyvinyl acetate/acrylic resin esters dispersed in an aqueous solvent to impart an increased level of flexibility to said composition;
from about 3-4 parts by volume of an acrylic emulsion to serve as a film-forming binder for said coating composition;
from about 1-2 parts by volume of a gypsum-based powder compound to impart a required degree of strength and durability to said coating composition and to absorb substantially a major portion of said aqueous solvent which comprises said liquid latex polymer suspension; and
from about 1-3 parts by volume of a glue to bond together said polymer suspension, said acrylic emulsion and said gypsum-based powder compound and to facilitate adhesion of said coating composition to a substrate to which said coating composition is applied.

19. A coating composition which comprises:
from about 1-2 parts by volume of water-based latex paint comprising a polymer dispersion of a blend of polyvinyl acetate/acrylic resin esters;
from about 3-4 parts by volume of a liquid acrylic emulsion;
from about 1-2 parts by volume of a gypsum compound; and
from about 1-3 parts by volume of a glue-based adhesive material.

20. A coating composition which comprises:
from about 1-2 parts by volume of water-based latex paint comprising a polymer dispersion of a blend of polyvinyl acetate/acrylic resin esters;
from about 3-4 parts by volume of a liquid acrylic emulsion;
from about 1-2 parts by volume of a powdered gypsum-based material; and
from about 1-3 parts by volume of a glue-based adhesive material.

21. The composition of claim 20 wherein said powdered gypsum-based material is a gypsum-based plaster.

* * * * *